United States Patent [19]
Katoh et al.

[11] Patent Number: 5,051,292
[45] Date of Patent: Sep. 24, 1991

[54] BIAXIALLY ORIENTED FILM OF POLYETHYLENE-2,6-NAPHTHALATE

[75] Inventors: Hideo Katoh, Kanagawa; Hisashi Hamano, Sagamihara; Masahiro Hosoi, Tokyo; Tatsuya Ogawa, Sagamihara, all of Japan

[73] Assignee: Teijin Limited, Osaka, Japan

[21] Appl. No.: 473,152

[22] Filed: Jan. 31, 1990

[30] Foreign Application Priority Data

Feb. 1, 1989 [JP] Japan ................................ 1-20861
Feb. 1, 1989 [JP] Japan ................................ 1-20862

[51] Int. Cl.$^5$ ............................................. G11B 5/64
[52] U.S. Cl. ................................. 428/141; 428/480; 428/694; 428/900
[58] Field of Search ............... 428/480, 694, 900, 141, 428/128; 264/210.7, 288.4, 209.5, 291, 290.2, 291

[56] References Cited
U.S. PATENT DOCUMENTS
4,876,137 10/1989 Utsumi ................................ 428/480

Primary Examiner—Merrell C. Cashion, Jr.
Attorney, Agent, or Firm—Wenderoth, Lind & Ponack

[57] ABSTRACT

A biaxially oriented film of polyethylene-2,6-naphthalate having a Young's modulus of at least 650 kg/mm$^2$ in a given direction on the film plane and a direction crossing it at right angles, the difference between the Young's moduli in the two directions being at most 200 kg/mm$^2$, the difference between the thermal shrinkages in the two directions being 0 to 0.1%.

5 Claims, 1 Drawing Sheet

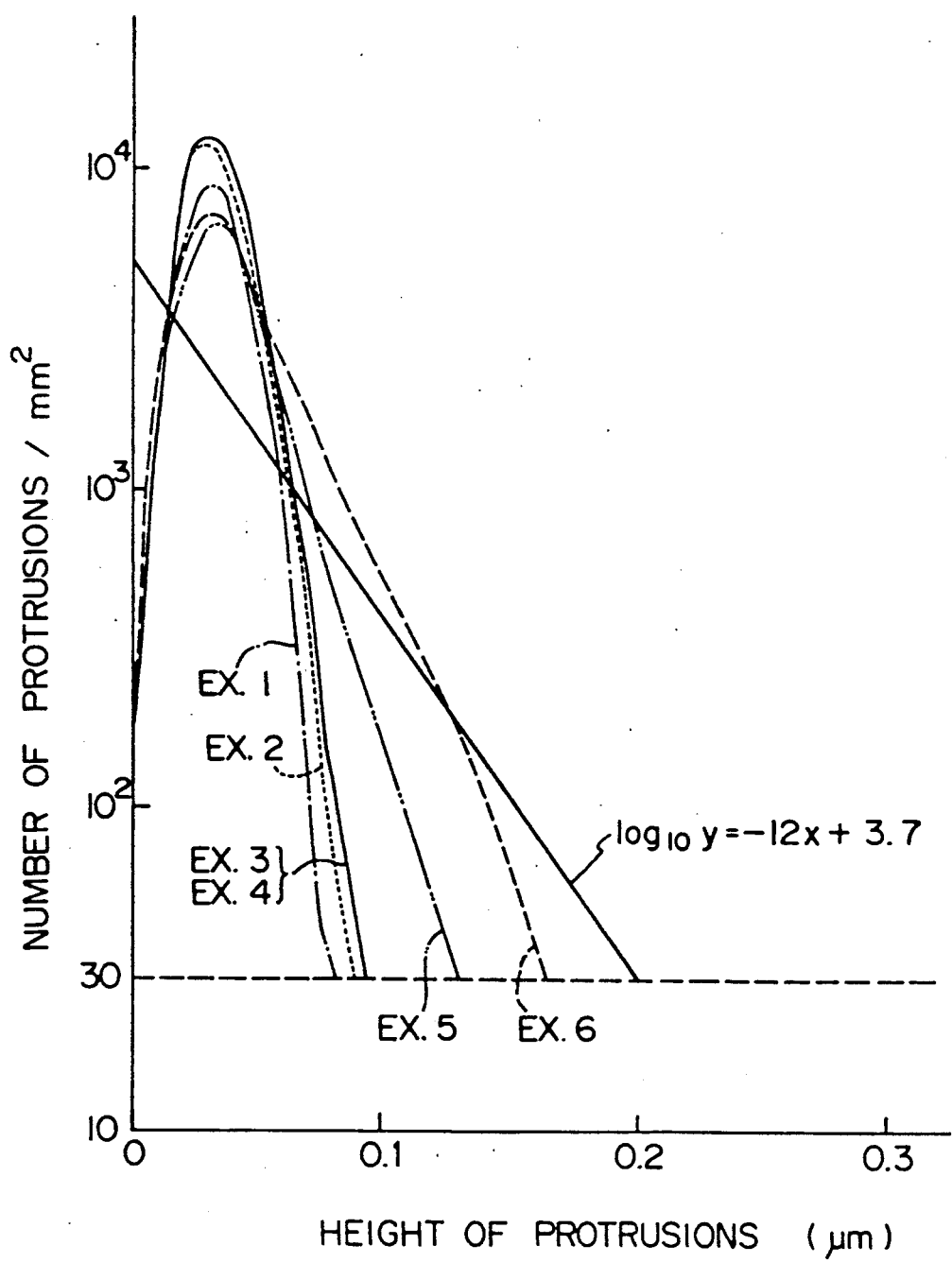

BIAXIALLY ORIENTED FILM OF POLYETHYLENE-2,6-NAPHTHALATE

This invention relates to a biaxially oriented film of polyethylene-2,6-naphthalate. More specifically, it relates to a biaxially oriented film of polyethylene-2,6-naphthalate having a high Young's modulus in the machine and transverse directions with a small difference in its Young's moduli in the two directions.

Recently, there has been a stronger requirement for the prolongation of the recording time of magnetic recording tapes. To prolong the recording time, it is necessary to reduce the total thickness of the magnetic recording tape and store it on a feed reel in a larger length. However, since the base film has to be reduced in thickness to decrease the total thickness of the tape, the tape actually has a reduced stiffness, and the tape edge is susceptible to scratching at the time of loading and unloading. Or in the event that a high tensile force should be exerted instantaneously on the tape, the tape will be deformed and strains may form in the records.

Accordingly, a base film for a magnetic material for recording over a prolonged period of time requires high Young's modulus.

Furthermore, with the recent widespread use of camera body type VTR, the magnetic recording tapes are often exposed to severe temperature conditions outdoors or within motor vehicles. Accordingly, there has been a strong requirement for dimensional stability in both the magnetic recording tapes and base tapes therefor to avoid skew distortions.

A biaxially oriented polyethylene terephthalate film has been used heretofore as a base film for the magnetic recording tape. Particularly, super tensilized films having Young's modulus in the machine direction is used for recording over a long period of time. The polyethylene terephthalate film, however, has a Young's modulus in the machine direction of at most 850 kg/mm$^2$ and a Young's modulus in the transverse direction of at most 450 kg/mm$^2$. Specifically, attempts to increase the Young's modulus in the machine direction necessarily result in a decrease in the Young's modulus in the transverse direction, and therefore, the tape is susceptible to damage at the edge part during travelling. If an attempt is made to increase the Young's modulus in the transverse (width) direction in the manufacture of films, sufficient Young's moduli cannot be obtained. For example, if the Young's modulus of the polyethylene terephthalate film is increased to 650 kg/mm$^2$, its Young's modulus in the transverse direction can be increased only to 500 to 600 kg/mm$^2$ at the highest, and the touch of the film with a magnetic head becomes aggravated, and variations occur in output. A base film having a high Young's modulus imparted by stretching it at a high stretch ratio has the disadvantage that distortions induced at the time of film formation remain, and it has low dimensional stability. In addition, another problem of stretching at a high stretch ratio is that the yield of the stretched products becomes low.

On the other hand, in the field of magnetic recording, there has recently been an increasing requirement for images of higher quality and records of higher density, and with it, the base films are required to be flat and slippery and have excellent handlability.

It is known that the slipperiness of a film may be improved by providing fine raisings and depressions on the surface of the film. It is known that to form such fine raisings and depressions on the film surface, inert fine inorganic particles are added during or after the synthesis of a thermoplastic polymer used as a material for the film (external particle addition method), or a catalyst and other materials used at the time of synthesizing a thermoplastic polymer are partly or wholly precipitated onto the polymer in a reaction step (interior particle precipitation method).

U.S. Pat. No. 4,818,581 discloses a biaxially oriented polyester film formed from an intimate mixture comprising (1) an aromatic polyester and (2) 0.01 to 4% by weight of spherical fine particles of silica having an average particle diameter of 0.05 to 4 micrometers, an aspect ratio of from 1.0 to 1.2 and a relative deviation standard of particle size of up to 0.5.

Japanese Laid-Open Patent Publication No. 43450/1987 discloses a polyester composition comprising a polyester and porous inert fine inorganic particles having a void ratio of at least 50% and an average particle diameter of 0.2 to 1.5 microns. It discloses that the polyester composition gives a film having improved travelling abrasion in which the interfacial peeling between the polymer and the fine particles does not easily occur. Specifically, it only discloses a film having a thickness of 15 micrometers.

Japanese Laid-Open Patent Publication No. 95339/1987 discloses a polyester composition comprising a polyester, porous inert fine inorganic particles having a void ratio of 50 to 95% and an average particle diameter of 0.05 to 3 microns and non-porous inner fine inorganic particles having an average particle diameter of 0.05 to 3 microns. This patent document states that the above polyester composition gives a film having the same properties as the film described in Japanese Laid-Open Patent Publication No. 43450/1987, and film scraps recovered may be re-used to give a film having satisfactory surface properties. Again, this patent document specifically discloses only a film having a thickness of 15 microns.

U.S. Pat. No. 4,804,736 discloses a polyester film for use as a support for high density magnetic recording tapes which has excellent heat resistance, a Young's modulus of not less than 800 kg/mm$^2$ in the machine direction and a Young's modulus of not less than 600 kg/mm$^2$ in the transverse direction, said film consisting of polyethylene-2,6-naphthalate.

Example 1 of this U.S. Pat. No. 4,804,736 discloses a polyethylene-2,6-naphthalate film having a Young's modulus in the machine direction of 820 kg/mm$^2$, a Young's modulus in the transverse direction of 740 kg/mm$^2$, and a heat shrinkage (150° C. × 30 minutes) in both directions of 1.6% and 0.5% respectively. Examples 2 to 6 merely disclose films having a Young's modulus difference between those in the two directions of at least 220 kg/mm$^2$ and a thermal shrinkage difference between those in the two directions of at least 1.5%.

It is an object of this invention to provide a biaxially oriented film of polyethylene-2,6-naphthalate.

Another object of this invention is to provide a biaxially oriented film of polyethylene-2,6-naphthalate which gives a magnetic recording material capable of permitting records of high image quality for a long period of time.

Still another object of this invention is to provide a biaxially oriented film of polyethylene-2,6-naphthalate having high Young's modulus and low heat shrinkages in the machine and transverse directions with a good balance.

A yet another object of this invention is to provide a biaxially oriented film of polyethylene-2,6-naphthalate having flatness, slipperiness and durability in addition to the aforesaid properties.

Other objects and advantages of the invention will become apparent from the following description.

In accordance with this invention, the above objects and advantages of the invention are achieved by a biaxially oriented film of polyethylene-2,6-naphthalate having a Young's modulus of at least 650 kg/mm² in a given direction on film plane and in a direction crossing said direction at right angles with the difference between the Young's moduli in the two directions being at most 200 kg/mm², the difference between the thermal shrinkages of the film in the two directions being 0 to 0.1%.

FIG. 1 accompanying this application shows the relation between the number of protrusions on the film surface and the height of the protrusions with regard to the biaxially oriented films of polyethylene-2,6-naphthalate shown in Examples 1 to 6 of the present application.

The polyethylene-2,6-naphthalate in this invention includes homopolymer or copolymers comprising at least 90 mole %, preferably at least 95 mole %, of ethylene 2,6-naphthalene dicarboxylate units, and mixtures of them with other polymers.

The above homopolymers may be produced by, for example, reacting naphthalene-2,6-dicarboxylic acid or its functional derivative with ethylene glycol or its functional derivative in the presence of a catalyst under suitable reaction conditions.

The above copolymers can be produced, for example, by adding at least one third component (modifier) and copolymerizing it with the above monomeric mixture before the polymerization of the monomeric mixture is completed. Examples of the suitable third component are compounds having a divalent ester-forming functional group, for example, dicarboxylic acids such as oxalic acid, adipic acid, phthalic acid, isophthalic acid, terephthalic acid, naphthalene-2,7-dicarboxylic acid, succinic acid and diphenyl ether dicarboxylic acid, lower alkyl esters of these dicarboxylic acids, hydroxycarboxylic acids such as p-hydroxybenzoic acid and p-hydroxyethoxybenzoic acid, lower alkyl esters of the hydroxycarboxylic acids, and dihydric alcohols such as propylene glycol and trimethylene glycol.

The polyethylene-2,6-naphthalate homopolymers or copolymers may have the terminal hydroxyl groups and/or the terminal carboxyl groups blocked with a monofunctional compound such as benzoic acid, benzoylbenzoic acid, benzyloxybenzoic acid or methoxypolyalkylene glycol. Alternatively, they may be modified with a small amount of a trifunctional or tetrafunctional esterforming compound such as glycerol or pentaerythritol so as to give substantially linear copolymers.

Preferably, the homo- or co-polymer of polyethylene-2,6-naphthalate has an intrinsic viscosity, measured at 35° C. for a solution in a mixture of 40% of phenol and 60% of 1,1,2,2-tetrachloroethane.

The biaxially oriented film of this invention has a Young's modulus of at least 650 kg/mm² in a given direction on film surface (for example, the machine direction) and in a direction crossing it at right angles (for example, transverse direction).

In a thin tape for recording and playback for a long period of time which has a Young's modulus of less than 650 kg/mm², distortions occur in images or sounds because during repeated use, the tape is stretched in the machine direction. If the Young's modulus in the transverse direction is less than 650 kg/mm², the strength of the tape in the transverse direction is low in repeated use, and damage is done to the tape edge.

The biaxially oriented film of this invention a Young's modulus of preferably at least 680 kg/mm², more preferably at least 700 kg/mm². It is necessary that in the biaxially oriented film of this invention, the difference of the Young's moduli in the two directions, for example in the machine and transverse directions, should be at most 200 kg/mm². If this difference exceeds 200 kg/mm², the tape is not compatible with the head of a video tape recorder, for example, and a sufficient output cannot be obtained at the time of re producing a recorded signal.

The difference in the Young's moduli is preferably not more than 150 kg/mm², more preferably not more than 100 kg/mm².

It is also necessary that in the biaxially oriented film of this invention, the difference of the thermal shrinkages in the above two directions crossing each other at right angles should be in the range of 0 to 0.1%, preferably 0 to 0.08%, more preferably 0 to 0.05%.

The thermal shrinkage as used in the present application denotes thermal shrinkage of the film when it is treated at 70° C. for 1 hour under no load. Preferably, the biaxially oriented film has a thermal shrinkage of not more than 0.15%, especially preferably not more than 0.06% in the direction in which the film has a higher Young's modulus. Generally in a step of processing a tape, the thermal shrinkage decreases. Generally, if the base film has a high thermal shrinkage, the thermal shrinkage of the tape becomes correspondingly high. This gives rise to another problem of increasing the skew of the tape.

In a first embodiment of this invention, there is provided a biaxially oriented film which in addition to the properties specified above, has a surface roughness (Ra) of at least 0.003 micrometer but less than 0.01 micrometer.

If its surface roughness (Ra) is less than 0.003 micrometer, the surface of the film becomes too flat, and industrially, its film take-up property is unsatisfactory. If, on the other hand, its Ra is 0.01 micrometer or more, the protrusions on the film surface are too large and its electromagnetic converting characteristics are degraded. Hence, the film has difficulty of withstanding use as a high-quality videotape.

This biaxially oriented film of the invention is further characterized in that its distribution curve representing the relation between the number of protrusions and the height of protrusions crosses the following equation $$log_{10}y = -12x + 3.7$$

wherein y is the number of protrusions per mm²,
and x is a height in micrometers of protrusions at least in that area of the film surface in which the number of protrusions is 30 per mm² and the height of protrusions is more than the maximum value of the distribution curve.

In a preferred film surface, the above equation is replaced by the following equation $$log_{10}y = -18x + 3.7$$

wherein x and y are as defined above.

Preferably, no protrusion having a height of at least 0.2 micrometer exist on the film surface.

The above biaxially oriented film of the invention has a number of fine protrusions on its surface. These fine protrusions are derived in this invention from many substantially inert solid fine particles dispersed in polyethylene-2,6-naphthalate.

Usually, the polyethylene-2,6-naphthalate containing many inert solid fine particles can be produced by adding inert solid fine particles (preferably as a slurry in a glycol) to the reaction system during the reaction of forming polyethylene-2,6-naphthalate, for example at any time during ester-interchange reaction or polycondensation, preferably in an early stage of polycondensation, before the intrinsic viscosity of the product reaches about 0.3.

In the present invention so-called external particles are preferably used. Examples include (1) silicon dioxide including hydrated silicon dioxide, diatomaceous earth, siliceous sand and quartz; (2) organic materials such as silicone and crosslinked polystyrene; (3) alumina; (4) silicates containing at least 30% by weight of $SiO_2$, such as amorphous or crystal clay mineral, aluminosilicates (including those calcined or hydrated), crysotile, zircon and fly ash; (5) oxides of Mg, Zn, Zr and Ti; (6) phosphates of Li, Ba and Ca (including monohydrogen or dihydrogen salts); (8) benzoates of Li, Na and K; (9) terephthalates of Ca, Ba, Zn and Mn; (10) titanates of Mg, Ca, Ba, Zn, Cd, Pb, Sr, Mn, Fe, Co and Ni;(11) chromates of Ba and Pb; (12) carbon (such as carbon blacks and graphites); (13) glass such as glass powders and glass beads; (14) carbonates of Ca and Mg; (15) feldspar; and (16) ZnS. They may be so-called internally precipitated particles from catalyst residues during the production of polymers. Mixtures of external particles and internally precipitated particles may also be used.

The particle diameter ratio (long diameter/short diameter) is preferably in the range of from 1.0 to 1.2, more preferably from 1.0 to 1.15, especially preferably from 1.0 to 1.1.

Preferably, the particles have a relative standard deviation ($\sigma$) defined below of not more than 0.5.

$$\sigma = \frac{\sqrt{\sum_{i=1}^{n}(D_i - \bar{D})^2 n}}{\bar{D}}$$

wherein $D_i$ is the diameter ($\mu$m) of the equivalent circular area of each of the particles, $\bar{D}$ is an average value ($\mu$m) of the diameter of the equivalent circular area defined by the following equation $$\bar{D} = \sum_{i=1}^{n} D_i/n$$

and n is the number of the particles, with the proviso that the diameter of the equivalent circular area denotes the diameter of each particle calculated when it is assumed that each particle is of a true spherical shape.

If spherical particles having a relative standard deviation of not more than 0.5 are used, the distribution of protrusions formed on the film surface is very uniform, and a polyethylene-2,6-naphthalate film of excellent slipperiness having protrusions of uniform heights can be obtained because the particles are completely spherical and have a very steep particle size distribution.

Preferably, the relative standard deviation is not more than 0.4, especially not more than 0.5.

Preferably, the above particles have an average particle diameter of 0.005 to 0.6 micrometer. If the average particle diameter is less than 0.005 micrometer, the slipperiness of the film is not sufficient. If, on the other hand, the average particle diameter is more than 0.6 micrometer, the height of protrusions on the film surface increases, and sufficient electromagnetic converting characteristics cannot be obtained. The average particle diameter of the fine inert particles is preferably 0.01 to 0.4 micrometer, especially 0.01 to 0.3 micrometer.

The particles having the above characteristics are markedly characterized by being discrete particles and differ from ultrafine bulky particles having a size of about 10 nm, conventionally known as slip agents, or agglomerated particles of about 0.5 micrometer in size resulting from agglomeration of these particles.

The long diameter, short diameter and area circle equivalent diameter of the above particles are determined from an image of the particles (on which a metal was vacuum-deposited) taken on an enlarged scaled scale of 10,000 to 30,000 times by an electron microscope.

The average particle diameter and the particle diameter ratio are calculated from the following equation.

Average particle diameter=(the total sum of the area circle equivalent diameters of the measured particles)/(the number of the measured particles)

Particle diameter ratio=(the average long diameter of particles)/(the average short diameter of the particles)

The suitable amount of the particles added is 0.005 to 3% by weight based on the polymer. It is preferably 0.05 to 2% by weight, especially 0.1 to 1.5% by weight.

The biaxially oriented film of this invention especially preferably has a long diameter/short diameter ratio of from 1.0 to 1.2, a relative standard deviation of particles of not more than 0.5, and contains 0.005 to 3% by weight of fine particles having a particle diameter in the range of 0.05 to 0.6 micrometer.

Such particles are preferably silica, silicone or crosslinked polystyrene particles.

So long as the spherical particles meet the aforesaid conditions, they are not limited in other respects including the method of their production. For example, spherical silica particles can be produced by hydrolyzing ethyl ortho-silicate [Si(OC$_2$H$_5$)$_4$] to prepare monodisperse particles of hydrous silica to a hydration treatment to grow silica bonds S($\equiv$Si—SO—Si$\equiv$) three-dimensionally (Journal of Chemical Society of Japan, '81, No. 9, p. 1503).

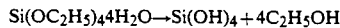
$$Si(OC_2H_5)_4 + 4H_2O \rightarrow Si(OH)_4 + 4C_2H_5OH$$

$$\equiv Si-OH + HO-Si\equiv \rightarrow \equiv Si-O-Si\equiv + H_2O$$

Spherical fine silicone resin particles have the composition shown by the following formula (A)

$$R_xSiO_{2-x/2}\ldots \qquad (A)$$

wherein R represents a hydrocarbon group having 1 to 7 carbon atoms and x is a number of 1 to 1.2.

R in formula (A) is a hydrocarbon group having 1 to 7 carbon atoms, for example, preferably an alkyl group having 1 to 7 carbon atoms, a phenyl group or a tolyl group. The alkyl group having 1 to 7 carbon atoms may be linear or branched, and includes, for example, methyl, ethyl, n-propyl, isopropyl, n-butyl, isobutyl, tert-butyl, n-pentyl, and n-heptyl groups.

Preferably, R represents a methyl group or a phenyl group, particularly the methyl group.

x in formula (A) is a number of 1 to 1.2. When x is 1 in formula (A), the formula (A) can be written as formula (A)-1

$$RSiO_{1.5} \ldots \qquad (A)\text{-}1$$

wherein R is as defined above.

The composition of formula (A)-1 is derived from the following structural portion in the three-dimensional polymer chain structure of the silicone resin.

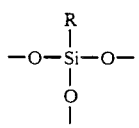

When x in formula (A) is 1.2, it can be taken that formula (A) is composed of 0.2 mole of the structure represented by $$R_{1.2}SiO_{1.4} \ldots \qquad (A)\text{-}2$$

wherein R is as defined above.

The formula (A)-2 is derived from the following structural portion in the three-dimensional polymer chain of the silicone resin.

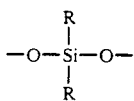

It can be seen from the foregoing description that the composition of formula (A) is composed substantially only of the structure of formula (A)-1, or is composed of the structure of formula (A)-1 and a suitable proportion of the structure of formula (A)-2 bonded to (A)-1 at random.

The fine spherical silicone resin particles preferably have an x value of 1 to 1.1 in formula (A).

These fine silicone resin particles can be produced, for example, by hydrolyzing and condensing a trialkoxysilane of the following formula $$RSi(OR')_3$$

wherein R represents a hydrocarbon group having 1 to 7 carbon atoms, and R' represents a lower alkyl group, or a partially hydrolyzed condensate thereof in the presence of ammonia, or an amine such as methylamine, dimethylamine or ethylenediamine with stirring. The above method starting from the above compound gives fine particles of a silicone resin having the composition of formula (A)-1.

If a dialkoxysilane of the following formula $$R_2SiO(OR')_2$$

wherein R and R' are as defined, is used in combination with the above trialkoxysilane in the above method, fine particles of a silicone resin having the composition of formula (A)-2 may be produced.

Spherical crosslinked polystyrene particles can be produced, for example, by emulsion-polymerizing at least one monomer selected from styrene monomers such as styrene, methylstyrene, α-methylstyrene and dichlorostyrene, conjugated monomers such as butadiene, unsaturated nitrile monomers such as acrylonitrile, methacrylic acid esters such as methyl methacrylate, unsaturated carboxylic acids, hydroxyl-containing monomers such as hydroxyethyl methacrylate monomers having an epoxide group such as glycidyl methacrylate, and unsaturated sulfonic acids and crosslinking agents for imparting a three-dimensional structure to polymer particles, for example, polyfunctional vinyl compounds such as divinylbenzene, ethylene glycol dimethacrylate, trimethylolpropanetriacrylate and diallylphthalate in an aqueous medium containing a water-soluble polymer as a protective colloid to prepare an emulsion of polymer particles, recovering the polymer particles from the emulsion, drying them, then jet-milling the dried polymer particles, and classifying the particles.

The spherical crosslinked polystyrene particles do not dissolve nor melt during the polymerization of polyethylene-2,6-naphthalate nor they melt the polymer at the time of melting the polymer for film formation.

In a second embodiment of the invention, the biaxially oriented film has a surface roughness (Ra) of 0.01 to 0.05 micrometer. As shown by the surface roughness, the biaxially oriented film of the invention has many fine protrusions on its surface. These many protrusions are derived from substantially inert fine solid particles dispersed in polyethylene-2,6-naphthalate. The solid fine particles are, preferably silica particles, silicone resin particles or crosslinked polystyrene particles. Above all, silica particles are advantageously used.

Polyethylene-2,6-naphthalate containing these solid particles can be produced in the same way as in the production of polyethylene-2,6-naphthalate described above with regard to the first embodiment.

The film in the second embodiment has a larger surface roughness (Ra) than in the first embodiment. Hence, particles used are relatively large, and preferably have a particle diameter of 0.3 to 2.5 micrometers, more preferably 0.4 to 1.0 micrometer, especially preferably 0.4 to 0.8 micrometer.

The above fine particles preferably have a volume shape factor (f) defined by the following equation of larger than 0.2 but not more than $\pi/6$.

$$F = V/D^3$$

wherein V is the average volume ($\mu m^3$) per particles, and D is the average maximum particle diameter ($\mu m$) of the particles.

In the above definitions, the average maximum particle diameter of particles defined by D denotes the longest distance between two points obtained when a straight line crosses a circumference of a particle.

The preferred f value of the fine particles in this invention is $0.3 - \pi/6$, especially $0.4 - \pi/6$. A particle having an f value of $\pi/6$ is a completely spherical particle. The use of fine particles having an f value smaller than the above lower limit makes it very difficult to control the various surface properties of the film.

The spherical particles to be dispersed in the polyester in this invention have a particle diameter ratio (long diameter/short diameter) of suitably 1.0 to 1.2, preferably 1.0 to 1.15, especially preferably from 1.0 to 1.1, and the individual particles are very near completely spherical particles.

The above spherical particles preferably has a relative standard deviation, as defined hereinabove, of at least 0.5, more preferably at least 0.4, especially preferably at least 0.3.

The long diameter, the short diameter and the area circle equivalent diameter of the spherical particles can be measured and calculated in the same way as described with regard to the first embodiment.

The amount of the particles to the added is preferably 0.005 to 2% by weight, more preferably 0.01 to 0.6% by weight, and especially preferably 0.05 to 0.5% by weight, based on the polymer.

The biaxially oriented film of the second embodiment of the invention, especially preferably contains 0.005 to 2% by weight of fine particles having a volume shape factor (f) of $0.2 - \pi/6$, and a relative standard deviation of not more than 0.5.

The spherical silica particles derived from the same sources as described with regard to the first embodiment may be preferably used.

The spherical silicone resin particles described with regard to the first embodiment are equally preferred. In particular, those having a particle size distribution ratio ($\gamma$) represented by the following formula of 1 to 1.4 are suitable.

$$\gamma = D_{25}/D_{75}$$

wherein $D_{25}$ is the average particle diameter ($\mu$ms) when the cumulative weight of the particles is 25%, and $D_{75}$ average particle diameter ($\mu$m) when the cumulative weight of the particles is 75%.

The particle size distribution ratio is more preferably 1 to 1.3, especially preferably 1 to 1.15.

The same crosslinked polystyrene particles as described with regard to the first embodiment are preferably used in the second embodiment.

The inert solid fine particles used in this invention are characterized by having (i) the shape of a nearly complete sphere, (ii) a small particle diameter, (iii) a narrow particle size distribution, and (iv) good affinity for the polyester.

The biaxially oriented film in the second embodiment of the invention may contain other inert fine particles in addition to the solid fine particles. These other inert fine particles may be the external particles (3) to (16) described with regard to the first embodiment, and conventional silica particles or internally precipitated particles used heretofore. Examples of these external particles include silicic anhydride, hydrous silicic acid, aluminum oxide, aluminum silicate (including those calcined or hydrated), monolithium phosphate, trilithium phosphate, sodium phosphate, calcium phosphate, barium sulfate, titanium oxide, lithium benzoates, double salts including hydrates of these compounds, glass powder, clays (including kaolin, bentonite and terra alba), talc, diatomaceous earth, and calcium carbonate. Silicon dioxide and calcium carbonate are especially preferred.

The internally precipitated particles are formed from catalyst residues during polyester production, and included in the polymer. To disperse these particles in the polymer, the known methods of forming internally precipitated particles may be used. For example, the methods disclosed in Japanese Laid-Open Patent Publications Nos. 61556/1973, 112860/1976, 115803/1976, 41355/1978 and 90397/1979 can be used. It is preferred to form such internal particles after the monomer forming reaction is substantially terminated and till the initial stage of the polycondensation. Calcium compounds and lithium compounds are preferred as a catalyst used in the monomer forming reaction or compounds to be added in this reaction stage. Examples of components for forming these calcium compounds or lithium compounds include aliphatic carboxylic acids such as acetic acid, propionic acid and butyric acid; aromatic carboxylic acids such as benzoic acid, p-methylbenzoic acid and naphthoic acid; alcohols such as methanol, ethanol, propanol and butanol; glycols such as ethylene glycol and propylene glycol; chlorine; and hydrogen.

The internally precipitated particles are formed usually by adding a phosphorus compound to a system in which the aforesaid compounds are present. Examples of the phosphorus compound are phosphoric acid, phosphorous acid, and esters of these (such as alkyl esters or aryl esters). For the formation, particle size adjustment and stabilization of the internally precipitated particles, other additives such as lithium phosphate may be used. Since internally precipitated particles containing calcium, lithium and phosphorus have a relatively large particle diameter and those containing lithium and phosphorus have a relatively small particle diameter, the composition may be varied according to the desired particle diameter. Preferred internally precipitated particles are particles containing 0.03 to 5% by weight of lithium element, 0.03 to 5% by weight of calcium element and 0.03 to 10% by weight of phosphorus element.

In the present invention, the internally precipitated particles have an average particle diameter of 0.01 to 2.5 micrometers, preferably 0.05 to 2.0 micrometers, more preferably 0.1 to 1.5 micrometers, and especially preferably 0.1 to 1.0 micrometer. If the average particle diameter is less than 0.01 micrometer, surface raisings and depressions which satisfy slipperiness do not appear on the film surface, and the occurrence of a white dust cannot be prevented. On the other hand, when the average particle diameter exceeds 2.5 micrometers, a white dust occurs markedly to an undesirable extent.

The film of this invention may contain 0.005 to 2.0% by weight (based on the aromatic polyester) of the internally precipitated particles. If the amount of the particles is less than 0.005% by weight, slipperiness cannot be imparted sufficiently. On the other hand, if it exceeds 2.0% by weight, the surface flatness of the film will be undesirably reduced.

The amount of the particles is preferably 0.01 to 1% by weight, more preferably 0.01 to 0.5% by weight, especially preferably 0.05 to 0.3% by weight.

A minor amount of another metal component such as zinc, manganese, magnesium, cobalt, antimony, germanium or titanium, may be incorporated in the internally precipitated particles so long as it does not reduce the effect of the invention.

It has been found that in accordance with this invention, by using internally precipitated fine particles in which the occurrence of voids is very little in combination with silica, silicone resin or crossslinked polystyrene fine particles as relatively large particles, a film having excellent travelling property, abrasion resistance, fatigue resistance, electrical insulating property and transparency can be obtained while retaining the advantage of using two types of particles.

The production of the biaxially oriented films of the invention (both in the first and second embodiments) is started by sufficiently kneading polyethylene-2,6-naphthalate with, for example, spherical particles with or without inert external particles or internally precipitated particles in a polymerization vessel before or during polymerization of polyethylene-2,6-naphthalate, or in an extruder when the resulting mixture is pelletized after polymerization, or in an extruder when the mixture is to be melt-extruded into a sheet.

The polyethylene-2,6-naphthalate film of this invention can be produced, for example, by melt-extruding polyethylene-2,6-naphthalate, for example, at a temperature of its melting point (Tm: ° C.) to (Tm+70) ° C. to obtain an unstretched film having an intrinsic viscosity of 0.35 to 0.9 dl/g, stretching the unstretched film monoaxially (in the machine or transverse direction) at a temperature of (Tg−10) ° C. to (Tg+70) ° C. (Tg stands for the glass transition temperature of the aromatic polyester) at a stretch ratio of 2.5 to 5.0, and then stretching it in a direction at right angles to the above stretching direction (when the first-stretching direction is the machine direction, the second stretching direction become the transverse direction) at a temperature of Tg ° C. to (Tg+70) ° C. and a stretch ratio of 2.5 to 5.0. Preferably, the area stretch ratio is preferably 9 to 22, especially 12 to 22. The stretching may be simultaneous biaxial stretching or consecutive biaxial stretching.

Furthermore, the biaxially oriented film can be heat-set at a temperature of (Tg+70)° C. to Tm (° C.). For example, the polyethylene-2,6-naphthalate film may be heat-set at 190° to 250° C. The heat-setting temperature is, for example, 1 to 60 seconds.

To improve mechanical properties further, the biaxially stretched film is heat-set at a temperature of (Tg+20)° C. to (Tg+70)° C., further stretched longitudinally or transversely at a temperature 10° to 40° C. higher than the above heat-setting temperature, further stretched transversely or longitudinally at a temperature 20° to 50° C. higher than this temperature at a stretch ratio of 5.0 to 6.9 (in the case of longitudinal stretching) or a total stretch ratio of 5.0 to 6.9 (int he case of transverse stretching) heat-setting.

The stretching may be consecutive biaxial stretching or simultaneous biaxial stretching. The longitudinal direction or the transverse stretching is not limited to one, but may be carried out a plurality of times.

By any method, the biaxially oriented film can be finally heat-set at a temperature of (Tg+70)° C. to TM° C. For example, the polyethylene-2,6-naphthalate film is preferably heat-set at a temperature of 190° to 240° C. The heat-setting temperature is, for example, 1 to 60 seconds.

The base film has a thermal shrinkage of not more than 0.15%, preferably not more than 0.10%, more preferably not more than 0.06%, when heat-treated under no load at 70° C. for 1 hour. IF its thermal shrinkage is larger than 0.15%, the skew of the magnetic tape increases, and depending upon a picture tube, distortion occurs in the image, and a valuable record might be damaged undesirably.

The thermal shrinkage of a film having a high Young's modulus may be reduced by heating the heat-treated film under a low tension, and relaxing it in the machine direction. The method of relaxing the film in the machine direction may be, for example, a floating treatment by a pneumatic force by which the film is relaxed by heating under a low tension without contact, a method in which the film is relaxed by passing it between a hot roll and a cold roll both having a nip roll at different speeds, or a method in which the film is relaxed in the machine direction by consecutively decreasing the speed of advancing a clip grasping the film in a tenter. Any method can be used by which the film can be relaxed in the machine direction.

The polyester film has a thickness of 1 to 50 micrometers, preferably 1 to 15 micrometers. Preferably, the film thickness is larger than the particle diameter of the inert fine particles contained in the film.

The polyester film of this invention has a low coefficient of friction during travelling, and very good operability. When this film is used as a base of a magnetic tape, the abrasion of the base film owing to frictional contact with the travelling portion of a magnetic recording and playback device (hardware) is very little, and high electromagnetic converting characteristics can be obtained with good durability.

Furthermore, the biaxially oriented polyester film of the invention has good windability during film formation and winding creases do not significantly form. Another advantage is that dimensionally, the film can be slit sharply. The use of this film as a base film has the advantage that magnetic film products can be produced easily and stably.

By the combination of the advantages of film products and the advantages of the film during its formation, the film of this invention is particularly suitable in high-grade magnetic applications, and also has the advantage of permitting production of magnetic film products easily and stably.

The polyethylene-2,6-naphthalate film of this invention is useful and suitable as a base film of high-grade magnetic recording media, such as ultrathin audio and video films for long-hour recording, high density recording magnetic films, and magnetic films for recording and playback of high-quality pictures, such as metalized or metal evaporated magnetic media.

Accordingly, the present invention also provides a magnetic recording medium composed of the biaxially oriented polyester film of this invention, and a magnetic layer formed on one or both surfaces of the film.

The magnetic layer and the method of providing the magnetic layer on the base film are well known in the art, and may be employed in this invention.

For example, when a magnetic layer is to be formed on the base film by coating a magnetic coating composition, known ferromagnetic materials such as $\gamma$-$Fe_2SO_3$, Co-containing $\gamma$-$Fe_3O_4$, and $Fe_3O_4$, $CrO_2$ and barium ferrite which contain Co may be used to prepare the magnetic coating composition.

The binder to be used together with the magnetic powder may be chosen from known thermoplastic resins, thermosetting resin, reactive resins and mixtures of these. A vinyl chloride/vinyl acetate copolymer and polyurethane elastomers may be cited as examples of the binder resins.

The magnetic coating composition may further comprise a polishing agent such as $\alpha$-alumina, an electrically conductive agent such as lecithin, a wetting agent such as n-butyl stearate or lecithinic acid, a curing agent such as an epoxy resin and a solvent such as methyl ethyl ketone, methyl isobutyl ketone or toluene.

The biaxially oriented film of this invention has a flat surface without high protrusions, and possesses high Young's moduli and dimensional stability, and is a very good base film for magnetic tapes of high quality.

Furthermore, the biaxially oriented film of this invention has good travelling property and durability, and little variations in output, and is free from skew distortions. Accordingly, it enables reduction of the thickness of a magnetic recording tape for long hour recording cassettes of household VTR, and recording for long hours becomes possible.

The following examples further illustrate the present invention. The various properties and characteristic values in this invention were measured and defined as shown below.

(1) Film surface roughness (Ra)

Measured in accordance with JIS B 0601. By using a stylus-contacting surface roughness tester, SURFCOM 3B (made by Tokyo Precision Co., Ltd.), a film surface roughness curve was drawn with a stylus having a tip radius of 2 micrometers under a load of 0.07 g. A portion having a measuring length L was picked up from the film surface roughness curve in the direction of the centerline. When the centerline of the picked-up portion is taken as X axis and the direction of the longitudinal factor is taken as Y axis and the roughness curve is expressed by $Y = f(X)$, Ra (micrometers) given by the following equation is defined as the film surface roughness.

$$Ra = \frac{1}{L} \int_0^L |f(x)| dx$$

In the present invention, the standard length (L) was 0.25 mm and the film surface roughness was measured at eight sites. Three largest values were excluded, and the average value of the remaining five values was taken as Ra.

(2) Method of measuring the distribution of protrusions.

By using a three-dimensional roughness tester (SE-3CK, made by Kosaka Kenkyusho) the protrusion distribution was measured under the following conditions.

Stylus diameter: 2 micrometers
R: stylus pressure, 30 mg
Measuring length: 1 mm
Sampling pitch: 2 micrometers
Cutoff: 0.25 mm
Enlarging ratio in the longitudinal direction: 20,000
Enlarging ratio in the transverse direction: 200
Number of scans: 150

In the protrusion distribution curve, the protrusion height (Z level) at which the ratio of area form the standard level was 70% was taken as a 0 level. The difference of the height of 0 level from that height was taken as a protrusion height (X axis) and the number of protrusions corresponding to it were plotted on the Y axis.

(3) Measurement of Young's modulus

A sample having a width of 10 mm and a length of 15 cm was cut off from the film, and pulled by an Instron-type universal tensile tester at a pulling speed of 10 mm/min. and a chart speed of 500 mm/min. with the distances between chucks being adjusted to 100 mm. The Young's modulus of the sample was calculated from the tangent to the rising portion of the resulting load-elongation curve.

4) Skew characteristics

A videotape which recorded a picture at room temperature (20° C.) was heat-treated at an ordinary humidity at 70° C. for 1 hour, and was played back at room temperature and an ordinary humidity. The amount of deviation might be measured by an image pattern.

(5) Electromagnetic converting characteristics of a film coated with a magnetic coating composition Acicular α-FeOOH containing 5% of cobalt was pyrolyzed, and the resulting α-Fe$_2$O$_3$ was reduced with hydrogen to obtain a black ferromagnetic metal powder. The ferromagnetic metal powder had a specific surface area, measured by the BET-type N$_2$ gas adsorption method, of 44 m$^2$/g.

One hundred parts by weight (parts hereinafter) of the ferromagnetic metal powder and a composition consisting of the following ingredients were kneaded and dispersed in a ball mill for 12 hours.

| | |
|---|---|
| Polyester polyurethane | 12 parts |
| Vinyl/vinyl acetate/maleic anhydride copolymer | 10 parts |
| α-alumina | 5 parts |
| carbon black | 1 part |
| Butyl acetate | 70 parts |
| Methyl ethyl ketone | 35 parts |
| Cyclohexanone | 100 parts |

After dispersing, 1 part of oleic acid, 1 part of palmitic acid and 1 part of amyl stearate were added, and the mixture was further kneaded for 15 to 30 minutes. A 25% ethyl acetate solution of a triisocyanate compound was added. The mixture was dispersed under high shear for 1 hour to prepare a magnetic coating dispersion.

The coating dispersion was coated on a polyester film of the invention so as to provide a dry film thickness of 3.0 micrometers.

The film was subjected to an aligning treatment in a dc magnetic field, and then dried at 100° C. After drying, the film was calendered, and slit to a width of ½ inch to form magnetic videotapes.

The video characteristics were the results of measurement of reproduction output at 4MHz using the VHS type VTR ("HR 7300", produced by Japan Victor Co., Ltd.) having a recording playback head constructed of "Sendust" alloy. The standard tape was a commercial ½ inch VHS tape coated with a γ-Fe$_2$O$_3$ layer.

The CN ratio was determined when a carrier signal at 4MHz was recorded, and the level at 3.0MHz of the reproduced amplitude modulated signal was taken as a noise level.

(6) Coefficient friction

A glass plate was placed on two superimposed films, and the lower film in contact with the glass plate was taken up by constant-speed rolls (about 10 to 15 cm/min.), a detector was fixed to one end (that end which was opposite to the takeup direction of the lower film) of the upper film, and the pulling speed between the film and the film was measured The thread used at this time had a weight of 1 to 5 kg, and an under side area of 10 to 100 cm$^2$.

(7) Thermal shrinkage

The length of the sample was first measured. Then, the sample was heat-treated by allowing it to stand for 1 hour in a tension-free condition in a pneumatic constant temperature vessel kept at 70° C. The length of the sample after cooling it was measured at room temperature. Its thermal shrinkage was calculated from its lengths before and after the heat treatment.

(8) Measurement of the particle diameter, etc. of particles (1) Particle diameter of spherical silica particles, silicone particles and crosslinked polystyrene particles a) Average particle diameter and particle diameter ratio of spherical fine particles Spherical fine particles were placed sparsely while avoiding superposition of the individual particles on a sample stand of an electron microscope A thin gold vapor-deposited layer having a thickness of 200 to 300 angstrom was formed on the surface of the fine particles by a gold sputtering device. The spherical fine particles were then observed by a scanning electron microscope at a magnification of 10,000 to 30,000 X. By a Lizex 500 made by Japan Regulater Co., the maximum diameters (Dli), the minimum diamerers (Dsi) and the area circle equivalent diameters (Di). The maximum diameter (Dl), minimum diameter (Ds) and average particle diameter ($\overline{D}$) were expressed by thre number averages represented by the following equations.

$$Dl = \left( \sum_{i=1}^{n} Dli \right) / n,$$

$$Ds = \left( \sum_{i=1}^{n} Dsi \right) / n,$$

$$\overline{D} = \left( \sum_{i=1}^{n} Di \right) / n$$

b) Measurement of spherical fine particles in the film

A small sample film piece was fixed to a sample stand of a scanning electron microscope. By using an ion sputtering device (JFC-1100 made by Japan Electronics Co., Ltd.), ion etching treatment was carried out on the film surface under the following conditions. The sample was ground in a bell jar. The degree of vacuum was increased to a vacuum of about $10^{-3}$ torr. The ion etching was performed for about 10 minutes at a voltage of 0.25 KV and a current of 12.5 mA. Furthermore, by using the same device gold sputtering was performed on the film surface in the same way as in (a) above. The film surface was observed under a scanning electron microscope at a magnification of 10,000 to 30,000. The maximum diameter (Dli), minimum diameter (Dsi) and area circle equivalent diameter (Di) of at least 100 particles were measured.

(2) Average particle diameter (DP) of other inert particles

It was measured by using a centrifugal particle size analyzer (model CP-50 made by Shimazu Seisakusho K.K.). From the cumulative curve of particles having a specific particle diameter and the amounts of the particles having that size which were calculated on the basis of the resulting centrifugal sedimentation curve, the particle diameter corresponding to 50 mass percent was read. This value was defined as the average particle diameter (a Japanese language book entitled "Particle Size Measuring Technique", pages 242-247, 1975, published by Nikkan Kogyo Press).

(3) Relative standard deviation

The differential particle size distribution is determined from the cumulative curve obtained in paragraph a).

The relative standard deviation is calculated in accordance with the following equation.

$$\text{Relative standard deviation } (\sigma) = \sqrt{\sum_{i=1}^{n} (D_i - \overline{D})^2 \phi_i / \overline{D}}$$

wherein Di is the particle diameter (μm) determined in paragraph (a) above, $\overline{D}$ is the average particle diameter (μm) determined in paragraph (a) above, n is the number of divisions used in determining the cumulative curve in paragraph (a), and φi is the probability of existence of particles of the individual particle sizes (mass percent).

(9) Particle diameter and amount of internally precipitated particles

The polyester or the polyester film was fully washed with methanol to remove the matter adhering to its surface. Five hundred grams of the film was sampled, and 4.5 kg of o-chlorophenol was added. With stirring, the temperature was elevated to 100° C. The film was left to stand for further 1 hour to dissolve the polyester portion of the film. When the polyester portion was crystalized to a high degree or otherwise, and could not be dissolved, it was melted and quenched for the test and then subjected to the above dissolving operation.

Then, the solution was filtered through a C-1 glass filter to remove coarse insoluble matter other than the internal particles, such as dust contained in the polyester and a reinforcing agent added. The weight of the removed matter was subtracted from the weight of the sample.

The separation ended in about 40 minutes. If required, the end of separation can be determined by comparing the light transmittance at 375 mμ of the solution after separation with that before the separation. If this value became a higher constant value, the end of separation can be determined. After the separation, the supernatant was removed by decantation to obtain separated particles.

The separated particles could contain the polyester portion owing to insufficient separation. Thus, o-chlorophenol at room temperature is added to form a uniform suspension, and the suspension is again subjected to treatment by a supercentrifugal separator. This operation should be repeated until a melting peak corresponding to the polymer could not be detected as a result of scanning differential thermal analysis of the particles dried. Finally, the separated particles were dried in vacuo at 120° C. for 16 hours and weighed.

The separated particles obtained by the above operation contained both internally precipitated particles and spherical silica particles. It is necessary therefore to measure the amount of the internal particles and the amount of the spherical silica particles separately. The amounts of metals in the separated particles were quantified to determine the contents of Ca and Li and their metals. The separated particles were heated under reflex in ethylene glycol in an amount of 3 molar times for more than 5 hours, and then ethylene glycol was distilled off so that the temperature became 200° C., and depolymerization was carried out. As a result, only the internal particles dissolved. The remaining particles were centrifugally separated. The separated particles were dried, and weighed. The determined weight was the weight of external particles. The difference from the total amount of the initial separated particles was defined as the amount of internally precipitated particles.

(10) Edge damage

Using as commercial VHS type VTR, the magnetic tape in a T-120 cassette was travelled thirty times in a playback mode repeatedly for the first 3 minutes from the start. The cassette was taken out, and the loading portion, the unloading portion and the travelling portion of the tape were inspected for occurrence of injury in the edge portion of the tape. The evaluation of edge damage was carried out on 30 reels, and expressed as folllows:

○ : Injured tapes, 2 reels or less
Δ : Injured tapes, 3 to 4 reels
X : Injured tapes, 5 reels or more

(11) Coefficient of friction of the film ($\mu k$)

The film cut to a width of ½ inch was caused to contact a stainless steel (SUS304) fixed rod (surface roughness 0.1S to 1.0S; outside diameter 5 mm) at an angle $\theta = (52/180) \pi$ radian (152°), and moved (rubbed) at a rate of 200 cm/min.(at 20° C. and a relative humidity of 60%). After the film was travelled over 90 m, the tension ($T_2$: g) of the film was detected by an outlet tension detector when the tension controller was adjusted so that the inlet tension $T_1$ became 35 g. The coefficient of travelling friction was calculated by the following equation.

$$\mu k = (2.303/\theta) \log (T_2/T_1)$$
$$= 0.868 \log (T_2/35)$$

(12) Abrasion property

The abrasion property of the film on the travelling surface was evaluated by using a minisupercalender of 5 stages. The calender consisted of 5 stages of a nylon roll and a steel roll. The treating temperature was 80° C. The linear pressure on the film was 200 kg/cm. The film speed was adjusted to 50 meters/min. When the film was caused to travel over 2000 m in total, the abrasion of the base film was evaluated by the stain adhering to the top roller of the calender.

Evaluastion

⊚ : No stain on the nylon roll
○ : Hardly any stain on the nylon roll
X : Staining on the nylon roll
XX : Heavy staining on the nylon roll

(13) Frequency of occurrence of an injury to the tape

The sample tape was set in a commercial VHS type VTR, and travelled for 1 minute. Then, the travelling was stopped, and the tape was taken out. It was visually inspected, and that portion of the tape which travelled was visually observed. Then, again, the tape was travelled, and loading and unloading were repeated thirty times. The loaded and unloaded portions were visually examined to determine the occurrence of injury.

By the same technique as above, the test was performed on 30 reels, and the tape injury was evaluated on the following standards.

X : Injury occurred in 5 or more reels
Δ : Injury occurred in 3 to 4 reels
○ : Injury occurred in 2 or less reels

(14) Electromagnetic converting characteristics (chroma S/N)

By using a commercial home VTR, a signal obtained by superimposing a 100% chroma level signal on a 50% white level signal (the peak-to-peak level voltage of the 100% white level signal was 0.714) was recorded. Its playback signal was measured by a Shibasoku noise meter (type 925R). The chroma S/N defined by Shibasoku was as follows.

$$\text{Chroma } S/N \text{ } (dB) = 201 \log \frac{ES(p-p)}{EN(rms)}$$

wherein ES(p-p) is the potential (p-p) of the peak-to-peak of a playback signal of a white level signal.

$$ES(p-p) = 0.714 \text{ } V(-p)$$

EN(rms) is the square root of the peak voltage of the playback signal of the chroma level signal.

$$EN(rms) = Am \text{ noise root-mean-square voltage} \quad (V)$$

(15) Dropout

By a commercial dropout counter (for example, Shibasoku VH01BZ type), 5 microsec.×10 dB dropouts were counted, and the count number for 1 minute was calculated.

Examples 1-3, 5 and 6 and Comparative Examples 3, 4 and 6

Pellets of polyethylene-2,6-naphthalate (homopolymer) having an intrinsic viscosity of 0.60 containing the particles shown in Table 1 were dried at 170° C. for 4 hours. The pellets were melt-extruded by a conventional method to form an unstretched film having a thickness of 355 micrometers. The unstretched film was stretched and worked up under the conditions shown in Table 1, and the properties of the resulting stretched films were obtained. The results are shown in Table 1.

Example 4

In the same way as in Example 1, an unstretched film having a thickness of 375 micrometers was formed and then stretched and worked up as in Table 1. The properties of the film were measured, and the results are shown sin Table 1.

Comparative Example 1

An unstretched film having a thickness of 255 micrometers was prepared as in Example 1, and then stretched and worked-up under the conditions shown in Table 1. The properties of the film were measured, and the results are shown in Table 1.

Comparative Example 2

An unstretched film having a thickness of 215 micrometers was prepared as in Example 1, and then stretched and worked up under the conditions shown in Table 1. The properties of the stretched film were measured and the results are shown in Table 1.

TABLE 1

| Polymer | Polyethylene-2,6-naphthalate | Same as left |
|---|---|---|
| | Examples | |
| Particles added | Example 1 | Example 2 |
| Type | Silica | Silicone |
| Average particle diameter ($\mu$m) | 0.25 | 0.26 |
| Particle diameter ratio (long diameter/short diameter) | 1.10 | 1.15 |
| Relative standard deviation | 0.09 | 0.10 |
| Amount (wt. %) | 0.15 | 0.13 |
| Film-forming conditions | | |
| 1st stage longitudinal stretching temperature (°C.) × draw ratio | 120 × 2.3 | 120 × 2.3 |
| 1st stage transverse stretching temperature (°C.) × draw ratio | 135 × 3.7 | 135 × 3.7 |
| 1st stage heat-treatment temperature (°C.) | 160 | 160 |
| 2nd stage longitudinal stretching temperature (°C.) × draw ratio | 180 × 2.6 | 180 × 2.6 |
| 2nd stage transverse stretching temperature (°C.) × draw ratio | 190 × 1.6 | 190 × 1.6 |
| 2nd stage heat-treatment temperature (°C.) | 200 | 200 |
| 3rd stage longitudinal stretching temperature (°C.) × draw ratio | — | — |
| 3rd stage transverse stretching temperature (°C.) × draw ratio | — | — |
| 3rd stage heat-treatment temperature (°C.) | — | — |
| Longitudinal relaxtion temperature (°C.) | 130 | 130 |
| Longitudinal relaxation tension (kg/cm² of film section) | 30 | 30 |
| Properties of the film | | |
| Young's modulus in the machine direction (kg/mm², My) | 800 | 800 |
| Young's modulus in the transverse direction (kg/mm², Ty) | 750 | 750 |
| My-Ty | 50 | 50 |
| Surface roughness (Ra, $\mu$m) | 0.009 | 0.009 |
| 70° C. × 1 hour thermal shrinkage (machine × transverse) (%) | 0.048 × 0.083 | 0.048 × 0.083 |
| Coefficient friction | 0.30 | 0.32 |
| Protrusion distribution graph | FIG. 1 | FIG. 1 |
| Results of evaluation | | |
| Video output at 4MHz (dB) | +9.0 | +9.0 |
| CN ratio (dB) | +8.0 | +7.9 |
| Skew ($\mu$sec) | 5 | 5 |
| Edge damage | ○ | ○ |
| Overall evaluation | ⊚ | ⊚ |
| Particles added | Example 3 | Example 4 |
| Type | Crosslinked polystyrene | Same as left |
| Average particle diameter ($\mu$m) | 0.26 | 0.26 |

TABLE 1-continued

| Particle diameter ratio (long diameter/short diameter) | 1.12 | 1.12 |
|---|---|---|
| Relative standard deviation | 0.10 | 0.10 |
| Amount (wt. %) | 0.12 | 0.12 |
| Film-forming conditions | | |
| 1st stage longitudinal stretching temperature (°C.) × draw ratio | 120 × 2.3 | 120 × 2.3 |
| 1st stage transverse stretching temperature (°C.) × draw ratio | 135 × 3.7 | 130 × 3.0 |
| 1st stage heat-treatment temperature (°C.) | 160 | 150 |
| 2nd stage longitudinal stretching temperature (°C.) × draw ratio | 180 × 2.6 | 180 × 2.5 |
| 2nd stage transverse stretching temperature (°C.) × draw ratio | 190 × 1.6 | 180 × 1.6 |
| 2nd stage heat-treatment temperature (°C.) | 200 | 150 |
| 3rd stage longitudinal stretching temperature (°C.) × draw ratio | — | 190 × 1.05 |
| 3rd stage transverse stretching temperature (°C.) × draw ratio | — | 190 × 1.29 |
| 3rd stage heat-treatment temperature (°C.) | — | 200 |
| Longitudinal relaxation temperature (°C.) | 130 | 130 |
| Longitudinal relaxation tension (kg/cm² of film section) | 30 | 30 |
| Properties of the film | | |
| Young's modulus in the machine direction (kg/mm², My) | 800 | 820 |
| Young's modulus in the transverse direction (kg/mm², Ty) | 750 | 800 |
| My-Ty | 50 | 20 |
| Surface roughness (Ra, $\mu$m) | 0.008 | 0.008 |
| 70° C. × 1 hour thermal shrinkage (machine × transverse) (%) | 0.048 × 0.083 | 0.052 × 0.087 |
| Coefficient friction | 0.31 | 0.32 |
| Protrusion distribution graph | FIG. 1 | FIG. 1 |
| Results of evaluation | | |
| Video output at 4MHz (dB) | +9.0 | +9.0 |
| CN ratio (dB) | +7.9 | +8.2 |
| Skew ($\mu$sec) | 5 | 6 |
| Edge damage | ○ | ○ |
| Overall evaluation | ⊚ | ⊚ |
| Particles added | Example 5 | Example 6 |
| Type | Silica/titanium dioxide | Calcium oxide |
| Average particle diameter ($\mu$m) | 0.29/0.27 | 0.33 |
| Particle diameter ratio (long diameter/short diameter) | 1.11/1.2 | 2.1 |
| Relative standard deviation | 0.10/0.49 | 0.6 |
| Amount (wt. %) | 0.10/ 0.06 | 0.25 |
| Film-forming conditions | | |
| 1st stage longitudinal stretching temperature (°C.) × draw ratio | 120 × 2.3 | 120 × 2.3 |
| 1st stage transverse stretching temperature (°C.) × draw ratio | 135 × 3.7 | 135 × 3.7 |
| 1st stage heat-treatment temperature (°C.) | 160 | 160 |
| 2nd stage longitudinal stretching temperature | 180 × 2.6 | 180 × 2.6 |

TABLE 1-continued

| | | | Comparative Example 1 | Comparative Example 2 |
|---|---|---|---|---|
| (°C.) × draw ratio | | | | |
| 2nd stage transverse stretching temperature (°C.) × draw ratio | 190 × 1.6 | 190 × 1.6 | | |
| 2nd stage heat-treatment temperature (°C.) | 200 | 200 | | |
| 3rd stage longitudinal stretching temperature (°C.) × draw ratio | — | — | | |
| 3rd stage transverse stretching temperature (°C.) × draw ratio | — | — | | |
| 3rd stage heat-treatment temperature (°C.) | — | — | | |
| Longitudinal relaxation temperature (°C.) | 130 | 130 | | |
| Longitudinal relaxation tension (kg/cm² of film section) | 30 | 30 | | |
| Properties of the film | | | | |
| Young's modulus in the machine direction (kg/mm², My) | 800 | 800 | | |
| Young's modulus in the transverse direction (kg/mm², Ty) | 750 | 750 | | |
| My-Ty | 50 | 50 | | |
| Surface roughness (Ra, μm) | 0.009 | 0.008 | | |
| 70° C. × 1 hour thermal shrinkage (machine × transverse) (%) | 0.048 × 0.083 | 0.048 × 0.083 | | |
| Coefficient friction | 0.35 | 0.40 | | |
| Protrusion distribution graph | FIG. 1 | FIG. 1 | | |
| Results of evaluation | | | | |
| Video output at 4MHz (dB) | +8.7 | +8.3 | | |
| CN ratio (dB) | +7.3 | +6.8 | | |
| Skew (μsec) | 5 | 6 | | |
| Edge damage | ○ | ○ | | |
| Overall evaluation | ○ | Δ | | |
| | | | Comparative Example 1 | Comparative Example 2 |
| Particles added | | | | |
| Type | | | Silica | Same as left |
| Average particle diameter (μm) | | | 0.25 | 0.25 |
| Particle diameter ratio (long diameter/short diameter) | | | 1.10 | 1.10 |
| Relative standard deviation | | | 0.09 | 0.09 |
| Amount (wt. %) | | | 0.15 | 0.15 |
| Film-forming conditions | | | | |
| 1st stage longitudinal stretching temperature (°C.) × draw ratio | | | 120 × 2.3 | 120 × 2.3 |
| 1st stage transverse stretching temperature (°C.) × draw ratio | | | 135 × 3.7 | 135 × 3.7 |
| 1st stage heat-treatment temperature (°C.) | | | 160 | 160 |
| 2nd stage longitudinal stretching temperature (°C.) × draw ratio | | | 180 × 3.0 | 180 × 2.5 |
| 2nd stage transverse stretching temperature (°C.) × draw ratio | | | 190 × 1.0 | 190 × 1.0 |
| 2nd stage heat-treatment temperature (°C.) | | | 220 | 220 |
| 3rd stage longitudinal stretching temperature (°C.) × draw ratio | | | — | — |
| 3rd stage transverse stretching temperature (°C.) × draw ratio | | | — | — |
| 3rd stage heat-treatment temperature (°C.) | | | — | — |
| Longitudinal relaxation temperature (°C.) | | | 130 | 130 |
| Longitudinal relaxation tension (kg/cm² of film section) | | | 30 | 30 |
| Properties of the film | | | | |
| Young's modulus in the machine direction (kg/mm², My) | | | 1320 | 970 |
| Young's modulus in the transverse direction (kg/mm², Ty) | | | 530 | 630 |
| My-Ty | | | 790 | 340 |
| Surface roughness (Ra, μm) | | | 0.009 | 0.009 |
| 70° C. × 1 hour thermal shrinkage (machine × transverse) | | | 0.073 × 0.071 | 0.058 × 0.052 |
| Coefficient friction | | | 0.30 | 0.30 |
| Results of evaluation | | | | |
| Video output at 4MHz (dB) | | | +7.0 | +7.3 |
| CN ratio (dB) | | | +5.5 | +5.5 |
| Skew (μsec) | | | 8 | 7 |
| Edge damage | | | X | X |
| Overall evaluation | | | X | X |
| | | | Comparative Example 3 | Comparative Example 4 |
| Particles added | | | | |
| Type | | | Calcium carbonate | Kaolin |
| Average particle diameter (μm) | | | 0.40 | 0.53 |
| Particle diameter ratio (long diameter/short diameter) | | | 1.8 | 10 |
| Relative standard deviation | | | 0.54 | 0.57 |
| Amount (wt. %) | | | 0.20 | 0.12 |
| Film-forming conditions | | | | |
| 1st stage longitudinal stretching temperature (°C.) × draw ratio | | | 120 × 2.3 | 120 × 2.3 |
| 1st stage transverse stretching temperature (°C.) × draw ratio | | | 135 × 3.7 | 135 × 3.7 |
| 1st stage heat-treatment temperature (°C.) | | | 160 | 160 |
| 2nd stage longitudinal stretching temperature (°C.) × draw ratio | | | 180 × 2.6 | 180 × 2.6 |
| 2nd stage transverse stretching temperature (°C.) × draw ratio | | | 190 × 1.6 | 190 × 1.6 |
| 2nd stage heat-treatment temperature (°C.) | | | 220 | 170 |
| 3rd stage longitudinal stretching temperature (°C.) × draw ratio | | | — | — |
| 3rd stage transverse stretching temperature (°C.) × draw ratio | | | — | — |
| 3rd stage heat-treatment temperature (°C.) | | | — | — |
| Longitudinal relaxation temperature (°C.) | | | 130 | — |
| Longitudinal relaxation tension (kg/cm² of film section) | | | 30 | — |
| Properties of the film | | | | |
| Young's modulus in the machine direction (kg/mm², My) | | | 800 | 800 |
| Young's modulus in the transverse direction (kg/mm², Ty) | | | 750 | 750 |
| My-Ty | | | 50 | 50 |
| Surface roughness (Ra, μm) | | | 0.013 | 0.015 |
| 70° C. × 1 hour thermal shrinkage (machine × transverse) | | | 0.048 × 0.083 | 0.048 × 0.083 |
| Coefficient friction | | | 0.39 | 0.39 |
| Results of evaluation | | | | |
| Video output at 4MHz | | | +6.8 | +6.7 |

TABLE 1-continued

| | | |
|---|---|---|
| (dB) | | |
| CN ratio (dB) | +5.0 | +5.3 |
| Skew (μsec) | 5 | 19 |
| Edge damage | ○ | ○ |
| Overall evaluation | X | X |

| Polymer | Polyethylene terephthalate | Polyethylene-2,6-naphthalate |
|---|---|---|
| | Examples | |
| Particles added | Comparative Example 5 | Comparative Example 6 |
| Type | Silica | Silica/silica |
| Average particle diameter (μm) | 0.26 | 0.15/0.65 |
| Particle diameter ratio (long diameter/short diameter) | 1.10 | 1.11/1.13 |
| Relative standard deviation | 0.09 | 0.10/0.12 |
| Amount (wt. %) | 0.15 | 0.20/0.07 |
| Film-forming conditions | | |
| 1st stage longitudinal stretching temperature (°C.) × draw ratio | 70 × 1.8 | 120 × 2.3 |
| 1st stage transverse stretching temperature (°C.) × draw ratio | 90 × 3.5 | 135 × 3.7 |
| 1st stage heat-treatment temperature (°C.) | 100 | 160 |
| 2nd stage longitudinal stretching temperature (°C.) × draw ratio | 90 × 2.8 | 180 × 2.6 |
| 2nd stage transverse stretching temperature (°C.) × draw ratio | 150 × 1.5 | 190 × 1.6 |
| 2nd stage heat-treatment temperature (°C.) | 200 | 200 |
| 3rd stage longitudinal stretching temperature (°C.) × draw ratio | — | — |
| 3rd stage transverse stretching temperature (°C.) × draw ratio | — | — |
| 3rd stage heat-treatment temperature (°C.) | — | — |
| Longitudinal relaxation temperature (°C.) | 130 | 130 |
| Longitudinal relaxation tension (kg/cm² of film section) | 30 | 30 |
| Properties of the film | | |
| Young's modulus in the machine direction (kg/mm², My) | 610 | 800 |
| Young's modulus in the transverse direction (kg/mm², Ty) | 620 | 750 |
| My-Ty | 10 | 50 |
| Surface roughness (Ra, μm) | 0.009 | 0.015 |
| 70° C. × 1 hour thermal shrinkage (machine × transverse) (%) | 0.20 × 0.20 | 0.048 × 0.083 |
| Coefficient friction | 0.32 | 0.30 |
| Results of evaluation | | |
| Video output at 4MHz (dB) | +7.0 | +6.9 |
| Cn ratio (dB) | +5.4 | +5.2 |
| Skew (μsec) | 7 | 5 |
| Edge damage | X | ○ |
| Overall evaluation | X | X |

The results given in Table 1 show that the films obtained in Examples had excellent properties in edge damage, electromagnetic converting characteristics and skew characteristic, and are on the level of high-grade thin videotapes. In addition, these films had low film-film coefficients of friction and good windability.

In Example 5, the titanium dioxide particles included had a slightly larger particle size distribution than the particles added in Examples 1 to 4, and the film had slightly inferior electromagnetic converting characteristics and slightly higher coefficient of friction. However, it was satisfactory on the whole.

In Example 6, the shape of the particles was slightly non-uniform as compared with Example 5. Its electromagnetic converting characteristics were slightly inferior, and it had a slightly higher coefficient of friction. But the film of Example 6 was on a satisfactory level.

The films obtained in Comparative Examples 1 and 2 had high Young's moduli in the machine direction but lower in the transverse direction with a large difference between them. Accordingly, the touch of the films on the magnetic head was bad. They had inferior electromagnetic converting characteristics and poor edge damage.

In Comparative Examples 3 and 4, the particles added had a large particle diameter ratio and a large relative standard deviation, and moreover do not satisfy the protrusion distribution graph. Hence, the electromagnetic converting characteristics of these films were unsatisfactory. In Comparative Example 4, the heat-treating temperature in the film-forming step was low, and the film was not subjected to heat relaxation treatment. Accordingly, the thermal shrinkage of the film on treatment at 70° C. for 1 hour was too high, and the skew characteristics of the tape were not satisfactory.

Since in Comparative Example 5, the starting material was the polyethylene terephthalate, the film obtained had low Young's moduli in the machine and transverse directions and its electromagnetic converting characteristics and edge damage were unsatisfactory.

In Comparative Example 6, the film did not satisfy the protrusion distribution graph, and its electromagnetic converting characteristics were unsatisfactory.

Example 7

Pellets of polyethylene-2,6-naphthalate (homopolymer) having an intrinsic viscosity of 0.62 containing 0.3% by weight of spherical fine silica particles having an average particle diameter of 0.5 micrometer were dried at 170° C. for 4 hours.

The dried pellets were melt-extruded to form an unstretched film having a thickness of 255 micrometers. The unstretched film was successively biaxially stretched at a stretch ratio of 4.8 in the machine direction at 120° C. and subsequently at a stretch ratio of 4.6 at 135° C., and further heat-set at 200° C. and stretched 15% transversely. The heat-set biaxially oriented polyethylene-2,6-naphthalate film was heated at 120° C. on a hot roll, and then its tension was adjusted between the hot roll and a cold roll to adjust its thermal shrinkage in the machine direction to about 0.06%. The resulting film had a thickness of 10 micrometers.

A magnetic coating composition composed of 100 parts by weight of Co-containing iron oxide powder, 10 parts by weight of S-lecA (a vinyl chloride/vinyl acetate copolymer produced by Sekisui Chemical Co., Ltd.), 10 parts by weight of Nippolane 2304 (polyurethane elastomer produced by Nippon Polyurethane Co., Ltd.), 5 parts by weight of Coronate L (polyisocyanate produced by Nippon Polyurethane Co., Ltd.), 1 part by weight of lecithin, 75 parts by weight of methyl ethyl ketone, 75 parts by weight of methyl isobutyl ketone, 75 parts by weight of toluene and 0.15 part by weight of an additive (silicone resin as a lubricant) was coated on the film by a gravure roll coater. The magnetic layer coated was smoothed by a doctor knife, while the magnetic layer was not dried, it was aligned, and then the magnetic layer was dried and cured in an oven. The magnetic film was calendered to made the coated surface uniform, the film was slit to produce a magnetic tape, ¼ inch wide, having a magnetic layer of about 4 micrometers in thickness. The properties of the magnetic tape are shown in Table 2.

In spite of the fact that the magnetic tape had a thickness of as thin as 14 micrometers, injuries to the tape were little, and the tape had good quality without adverse effects on the recorded pictures.

EXAMPLE 8

As in Example 7, pellets of polyethylene-2,6-naphthalate containing spherical silica particles were dried at 170° C. for 4 hours.

The pellets were melt-extruded in a customary manner to obtain an unstretched film having a thickness of 354 micrometers. The unstretched film was stretched in the machine direction at a stretch ratio of 2.3 at 120° C., and subsequently in the transverse direction at a stretch ratio of 3.7 at 135° C. The film was passed over several stages of hot rolls to heat it to 180° C., and further stretched in the machine direction at a stretch ratio of 2.6. The film was then fed into a tenter oven, and stretched gradually at a stretch ratio of 1.6 in an atmosphere kept at 190° to 200° C., and heat treated at 200° C.

Then, the film was treated quite as in Example 7 to give a stretched tape having a thickness of 14 micrometers. The tape had good properties and was free from injuries. It had good electromagnetic converting characteristics, and skew characteristic of 3 microseconds. The obtained data are summarized in Table 2.

EXAMPLES 9 AND 10

Example 7 was repeated except that in Example 9, silicone resin particles were added instead of the silica particles, and in Example 10, crosslinked polystyrene particles were used instead of the silica particles. The results are summarized in Table 2.

COMPARATIVE EXAMPLES 7 AND 8

Example 7 was repeated except that 0.2% by weight of calcium particles having a particle diameter of 0.6 micrometer, or 0.25% by weight of kaolin particles having an average particle diameter of 0.6 micrometer were added instead of the silica particles.

Magnetic tapes were prepared from the resulting film in accordance with Example 7. The magnetic tapes prepared were unsatisfactory in travelling property and abrasion property, and did not give satisfactory electromagnetic converting characteristics. The data are summarized in Table 2.

COMPARATIVE EXAMPLE 9

Spherical fine silica particles (average particle diameter of 0.5 micrometer) having a weight loss at 500° C. of 1.0% by weight were added in an amount of 15 parts by weight to 85 parts by weight of ethylene glycol (EG for short). They were mixed by stirring to form a slurry. When the slurry was filtered, the amount of the matter left on the filter was 800 ppm.

Then, 100 parts by weight of dimethyl terephthalate and 70 parts by weight of EF were esterinterchanged in a customary manner in the presence of 0.035 part by weight of manganese acetate tetrahydrate as a catalyst. Calcium carbonate obtained above (concentration: 0.3% by weight based on the polymer) was added with stirring. Subsequently, 0.03 part by weight of trimethyl phosphate and 0.03 part of antimony trioxide, and then polycondensation was carried out in a customary manner under vacuum at high temperature to give polyethylene terephthalate pellets having an intrinsic viscosity of 0.620. The polyethylene terephthalate (PET for short) pellets were dried at 170° C. for 3 hours, fed into a hopper of an extruder, and melted at 280° to 300° C. The molten polymer was passed through a slit die (1 mm) and extruded onto a rotating cold drum having a surface finish of about 0.38 and a surface temperature of 20° C. to give an unstretched film having a thickness of 265 1 micrometers.

The unstretched film so obtained was pre-heated at 75° C., passed between a low-velocity roll and a high velocity roll, and heated by an infrared heater having a surface temperature of 900° C. and placed 15 mm above the film and between these rolls. It was stretched to 1.8 times by the difference between the surface velocities of these rolls. It was quenched, fed into a stenter, and stretched transversely at a stretch ratio of 3.5 at 110° C. The resulting biaxially stretched film was heat set at 100° C for 5 seconds, further heated (the velocity difference between the hot roll and the cold roll) to 90° C., and stretched longitudinally at a stretch ratio of 2.8. The resulting film was further stretched transversely at a stretch ratio of 1.5 at 150° to 180° C., and again heat-set at 220° C.

The biaxially oriented polyethylene terephthalate film was subjected to a relaxation treatment at 120° C under tension of 30 kg/cm² (sectional area of the film). The resulting film had a thickness of 10 micrometers. A magnetic coating composition was coated was coated on the film in the same way as in Example 7. The obtained data are summarized in Table 2.

COMPARATIVE EXAMPLE 10

The film obtained by subjecting to a first stage heat-setting at 160° C. in Example 8 was passed through several stages of hot rolls, stretched at a stretch ratio of 3, and subjected to a second-stage heat-setting at 220° C. to obtain a film having a thickness of 10 micrometers. It was further relaxed longitudinally at 120° C. under 30 kg/cm² (film cross section).

A magnetic material was coated on the film to give a magnetic tape having a thickness of 14 micrometers. The data obtained are summarized in Table 2.

EXAMPLE 11

A magnetic tape having a thickness of 14 micrometers was obtained in the same way as in Example 7 except that 0.2% by weight of spherical silica having a particle diameter of 0.5 micrometer and 0.3% by weight of titanium dioxide particles having a particle diameter of 0.3 micrometer were added instead of the silica particles alone. The data obtained are summarized in Table 2.

EXAMPLE 12

In Example 7, spherical silicone resin particles having an average particle diameter of 0.6 micrometer were added for surface formation, and the film surface was formed by a mixture of these resins and internally precipitated particles in the polymer. Otherwise, the same procedure as in Example 7 was repeated.

The obtained data are summarized in Table 2.

EXAMPLE 13

Example 8 was repeated except that 0.1% by weight of silicone resin particles having an average particle of 0.6 micrometer and 0.3% by weight of titanium dioxide particles having an average particle diameter of 0.3 micrometer were added instead of the silica particles.

The resulting magnetic tape had relatively good abrasion property and good electromagnetic converting characteristics. Thee data obtained are shown in Table 2.

COMPARATIVE EXAMPLES 11 and 12

Comparative Example 10 was repeated except that silicone resin particles having an average particle diameter of 0.5 micrometer of crosslinked polystyrene resin particles were added instead of the silica particles.

When the Young's modulus of the film became high in one direction, the abrasion property of the film tended to become degraded, and the tape properties were degraded. The electromagnetic converting characteristics were not improved. Furthermore, there was much injury to the tapes.

The data obtained are summarized in Table 2.

TABLE 2

| Polymer | PEN | PEN |
|---|---|---|
| | Examples | |
| Particles added | Example 7 | Example 8 |
| Type | Spherical silica | Spherical silica |
| Average particle diameter ($\mu$m) | 0.5 | 0.5 |
| Relative standard deviation ($\delta$/d) | 0.09 | 0.09 |
| Amount (%) | 0.15 | 0.15 |
| Volume shape factor (f) | 0.5 | 0.5 |
| Properties of the film | | |
| Thickness ($\mu$m) | 10 | 10 |
| Young's modulus in the machine direction (kg/mm$^2$) | 700 | 800 |
| Young's modulus in the transverse direction (kg/mm$^2$) | 750 | 750 |
| Surface roughness (nm) | 17 | 16 |
| Coefficient friction | 0.17 | 0.16 |
| Abrasion property | ○ | ○ |
| 70° C. × 1 hour thermal shrinkage (machine × transverse) (%) | 0.043 × 0.030 | 0.048 × 0.083 |
| Preparation of the magnetic tape | | |
| Electromagnetic converting characteristics (dB) | +1.5 | +1.5 |
| Dropouts (number per minutes) | 7 | 8 |
| Durability (tape injuries) (injury occurrence frequency) | ○ | ○ |
| Skew ($\mu$sec) | 8 | 3 |
| Overall evaluation | ○ | ⊚ |
| Particles added | Example 9 | Example 10 |
| Type | Silicone resin | Crosslinked polystyrene |
| Average particle diameter ($\mu$m) | 0.5 | 0.5 |
| Relative standard deviation ($\delta$/d) | 0.1 | 0.1 |
| Amount (%) | 0.15 | 0.15 |
| Volume shape factor (f) | 0.48 | 0.49 |
| Properties of the film | | |
| Thickness ($\mu$m) | 10 | 10 |
| Young's modulus in the machine direction (kg/mm$^2$) | 700 | 700 |
| Young's modulus in the transverse direction (kg/mm$^2$) | 750 | 750 |
| Surface roughness (nm) | 20 | 18 |
| Coefficient friction | 0.16 | 0.18 |
| Abrasion property | ○ | ○ |
| 70° C. × 1 hour thermal shrinkage (machine × transverse) (%) | 0.043 × 0.030 | 0.043 × 0.030 |
| Preparation of the magnetic tape | | |
| Electromagnetic converting characteristics (dB) | +1.3 | +1.5 |
| Dropouts (number per minutes) | 5 | 5 |
| Durability (tape injuries) (injury occurrence frequency) | ○ | ○ |
| Skew ($\mu$sec) | 8 | 8 |
| Overall evaluation | ○ | ○ |
| Particles added | Comparative Example 7 | Comparative Example 8 |
| Type | Calcium carbonate | Kaolin |
| Average particle diameter ($\mu$m) | 0.6 | 0.6 |
| Relative standard deviation ($\delta$/d) | 0.54 | 0.6 |
| Amount (%) | 0.2 | 0.25 |
| Volume shape factor (f) | 0.24 | 0.06 |
| Properties of the film | | |
| Thickness ($\mu$m) | 10 | 10 |
| Young's modulus in the machine direction (kg/mm$^2$) | 700 | 700 |
| Young's modulus in the transverse direction (kg/mm$^2$) | 750 | 750 |
| Surface roughness (nm) | 24 | 26 |
| Coefficient friction | 0.27 | 0.35 |
| Abrasion property | X | Δ |
| 70° C. × 1 hour thermal shrinkage (machine × transverse) (%) | 0.043 × 0.030 | 0.043 × 0.030 |
| Preparation of the magnetic tape | | |
| Electromagnetic converting characteristics (dB) | −0.5 | −1.0 |
| Dropouts (number per minutes) | 20 | 30 |
| Durability (tape injuries) (injury occurrence frequency) | ○ | X |
| Skew ($\mu$sec) | 8 | 8 |
| Overall evaluation | X | X |
| Polymer | PET | PEN |
| Particles added | Comparative Example 9 | Comparative Example 10 |
| Type | Spherical silica | Spherical silica |
| Average particle diameter ($\mu$m) | 0.5 | 0.5 |
| Relative standard deviation ($\delta$/d) | 0.09 | 0.09 |
| Amount (%) | 0.15 | 0.15 |
| Volume shape factor (f) | 0.5 | 0.5 |
| Properties of the film | | |
| Thickness ($\mu$m) | 10 | 10 |
| Young's modulus in the machine direction (kg/mm$^2$) | 650 | 1300 |
| Young's modulus in the | 630 | 550 |

TABLE 2-continued

| | | |
|---|---|---|
| transverse direction (kg/mm²) | | |
| Surface roughness (nm) | 18 | 18 |
| Coefficient friction | 0.16 | 0.15 |
| Abrasion property | ○ | Δ |
| 70° C. × 1 hour thermal shrinkage (machine × transverse) (%) | 0.21 × 0.21 | 0.070 × 0.072 |
| Preparation of the magnetic tape | | |
| Electromagnetic converting characteristics (dB) | +1.0 | −0.5 |
| Dropouts (number per minutes) | 5 | 10 |
| Durability (tape injuries) (injuiry occurrence frequency) | X | X |
| Skew (μsec) | 6 | 3 |
| Overall evaluation | X | X |

| | | |
|---|---|---|
| Polymer | PEN | PEN |
| Particles added | Example 11 | Example 12 |
| Type | Spherical silica/titanium dioxide | Silicone resin/ internally precipitated particles containing Li, Ca and P |
| Average particle diameter (μm) | 0.5/0.3 | 0.6/0.6 |
| Relative standard deviation (δ/d) | 0.09/0.5 | 0.1/0.6 |
| Amount (%) | 0.2/0.3 | 0.1/0.3 |
| Volume shape factor (f) | 0.5/0.45 | 0.5/0.07 |
| Properties of the film | | |
| Thickness (μm) | 10 | 10 |
| Young's modulus in the machine direction (kg/mm²) | 700 | 700 |
| Young's modulus in the transverse direction (kg/mm²) | 750 | 750 |
| Surface roughness (nm) | 15 | 18 |
| Coefficient friction | 0.20 | 0.19 |
| Abrasion property | ○ | ⊚ |
| 70° C. × 1 hour thermal shrinkage (machine × transverse) (%) | 0.043 × 0.030 | 0.043 × 0.030 |
| Preparation of the magnetic tape | | |
| Electromagnetic converting characteristics (dB) | +1.0 | +1.0 |
| Dropouts (number per minutes) | 10 | 5 |
| Durability (tape injuries) (injuiry occurrence frequency) | ○ | ○ |
| Skew (μsec) | 6 | 6 |
| Overall evaluation | ○ | ○ |

| | | |
|---|---|---|
| Particles added | Example 13 | Comparative Example 11 |
| Type | Silicone resin/ titanium dioxide | Silicone resin |
| Average particle diameter (μm) | 0.6/0.3 | 0.5 |
| Relative standard deviation (δ/d) | 0.1/0.5 | 0.1 |
| Amount (%) | 0.1/0.3 | 0.15 |
| Volume shape factor (f) | 0.5/0.45 | 0.5 |
| Properties of the film | | |
| Thickness (μm) | 10 | 10 |
| Young's modulus in the machine direction (kg/mm²) | 800 | 1300 |
| Young's modulus in the transverse direction (kg/mm²) | 750 | 550 |
| Surface roughness (nm) | 15 | 18 |
| Coefficient friction | 0.20 | 0.20 |
| Abrasion property | ○ | ○ |
| 70° C. × 1 hour thermal shrinkage (machine × transverse) (%) | 0.048 × 0.083 | 0.070 × 0.072 |
| Preparation of the magnetic tape | | |
| Electromagnetic converting characteristics (dB) | +1.5 | −0.5 |
| Dropouts (number per minutes) | 7 | 5 |
| Durability (tape injuries) (injuiry occurrence frequency) | ○ | X |
| Skew (μsec) | 3 | 4 |
| Overall evaluation | ⊚ | X |

| | |
|---|---|
| Particles added | Comparative Example 12 |
| Type | Crosslinked polystyrene |
| Average particle diameter (μm) | 0.5 |
| Relative standard deviation (δ/d) | 0.1 |
| Amount (%) | 0.15 |
| Volume shape factor (f) | 0.48 |
| Properties of the film | |
| Thickness (μm) | 10 |
| Young's modulus in the machine direction (kg/mm²) | 1300 |
| Young's modulus in the transverse direction (kg/mm²) | 550 |
| Surface roughness (nm) | 19 |
| Coefficient friction | 0.20 |
| Abrasion property | Δ |
| 70° C. × 1 hour thermal shrinkage (machine × transverse) (%) | 0.070 × 0.072 |
| Preparation of the magnetic tape | |
| Electromagnetic converting characteristics (dB) | −0.5 |
| Dropouts (number per minutes) | 5 |
| Durability (tape injuries) (injuiry occurrence frequency) | X |
| Skew (μsec) | 4 |
| Overall evaluation | X |

We claim:

1. A biaxially oriented film of polyethylene-2,6-naphthalate having a. a thickness of 1 to 25 micrometers, b. a Young's modulus of at least 650 kg/mm² in a given direction on the film plane and a direction crossing it at right angles, the difference between the Young's moduli in the two directions being at most 200 kg/mm², the difference between the thermal shrinkages in the two directions being 0 to 0.1%, c. a surface roughness (Ra) of at least 0.003 micrometer but less than 0.01 micrometer, the distribution curve representing the relation between the number of protrusions on the film surface and the heights of the protrusions crossing the equation $$\log_{10} y = 12x + 3.7$$

wherein y represents the number of protrusions per mm², and x is the protrusion height (micrometers), at least in an area where the number of protrusions is 30/mm² and the protrusion height exceeds the maximum value of the distribution curve, the biaxially oriented film containing 0.005 to 3% by weight of fine particles in which the long diameter/short diameter ratio of the particles is from 1.0 to 1.2, a relative standard deviation of not more than 0.5, and an average particle diameter of 0.005 to 0.6 micrometer.

2. The biaxially oriented film of claim 1 which has a thermal shrinkage, in the direction in which it has a higher Young's modulus, of not more than 0.15%.

3. The biaxially oriented film of claim 1 in which the fine particles are selected from particles of silica, silicone and crosslinked polystryrene.

4. A biaxially oriented film of polyethylene-2,6-naphthalate having
   a. a thickness of 1 to 25 micrometers,
   b. a Young's modulus of at least 650 kg/mm² in a given direction on the film plane and a direction crossing it at right angles, the difference between the Young's moduli in the two directions being at most 200 kg/mm², the difference between the thermal shrinkages in the two directions being 0 to 0.1%.
   c. a surface roughness (Ra) of 0.01 to 0.05 micrometer, the distribution curve representing the relation between the number of protrusions on the film surface and the heights of the protrusions cross the equation $$log_{10}y = -12x + 3.7$$

wherein y represents the number of protrusions per mm², and x is the protrusion height (micrometers), at least in an area where the number of protrusions is 30mm² and the protrusion height exceeds the maximum value of the distribution curve, the biaxially oriented film containing 0.005 to 2% by weight of fine particles having a volume shape factor of 0.2 to $\pi/6$, a relative standard deviation of not more than 0.5 micrometer, and an average particle diameter of 0.01 to 2.5 micrometers.

5. The biaxially oriented film of claim 4 in which the fine particles are selected from fine particles of silica, silicone and crosslinked polystryrene.

* * * * *